United States Patent [19]

Kogure et al.

[11] 4,113,918

[45] Sep. 12, 1978

[54] UNDERCOAT-APPLIED PLASTIC FILMS

[75] Inventors: Motoo Kogure; Mamoru Komiya; Masaharu Ōishi; Masaru Kanbe, all of Sagamihara, Japan

[73] Assignee: Konishiroku Photo Industry Co., Ltd., Tokyo, Japan

[21] Appl. No.: 677,266

[22] Filed: Apr. 15, 1976

Related U.S. Application Data

[63] Continuation of Ser. No. 336,881, Feb. 28, 1973.

[30] Foreign Application Priority Data

Mar. 3, 1972 [JP] Japan .................................. 47-21534
Apr. 24, 1972 [JP] Japan .................................. 47-40381

[51] Int. Cl.² .................... B32B 27/36; G03C 1/78
[52] U.S. Cl. .................................. 428/412; 96/87 R; 96/87 A; 428/413; 428/421; 428/483; 428/520; 428/522
[58] Field of Search ......... 96/87 R, 87 A, 114.2 (U.S. only); 428/412, 413, 421 (U.S. only), 483, 500, 516, 522, 523

[56] References Cited

U.S. PATENT DOCUMENTS

| | | | |
|---|---|---|---|
| 3,143,421 | 8/1964 | Nadeau et al. | 96/87 |
| 3,201,251 | 8/1965 | Nadeau et al. | 96/87 |
| 3,245,937 | 4/1966 | Wagner | 260/29.7 |
| 3,262,807 | 7/1966 | Sterman et al. | 428/43 |
| 3,437,484 | 4/1969 | Nadeau | 96/87 |
| 3,475,193 | 10/1969 | Takenaka et al. | 96/84 R |
| 3,501,301 | 3/1970 | Nadeau et al. | 96/87 |
| 3,580,734 | 5/1971 | Clachan et al. | 96/75 X |
| 3,753,716 | 8/1973 | Ishihara et al. | 96/87 A |
| 3,837,886 | 9/1974 | Tatsuta et al. | 96/87 R |

FOREIGN PATENT DOCUMENTS

1,121,357 7/1968 United Kingdom.

*Primary Examiner*—P.E. Willis, Jr.
*Attorney, Agent, or Firm*—Bierman & Bierman

[57] ABSTRACT

This invention provides an undercoat-applied plastic film comprising a plastic film substrate and an undercoat layer on at least one surface of the plastic film substrate, said undercoat layer being formed by treating the film surface with a soluble high molecule compound expressed by the following general formula:

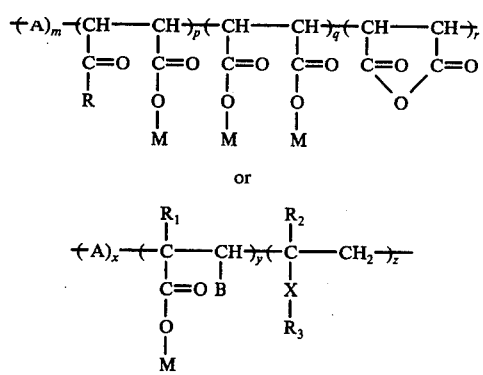

and a solvent or swelling agent for said plastic film substrate. This undercoat-applied aplastic film has an excellent antistatic property on the treated surface and exhibits a good adherence to a material to be applied thereto.

18 Claims, No Drawings

UNDERCOAT-APPLIED PLASTIC FILMS

This application is a Rule 60 continuation of co-pending Ser. No. 336,881 filed Feb. 28, 1973, which claims the priorities of Japanese Application Nos. 21534/72 and 40381/72 filed Mar. 3, 1972, and Apr. 24, 1972, respectively, all priorities of which are hereby claimed.

BACKGROUND OF THE INVENTION

In the art of plastic films, the under-coating treatment for improving adherence to a material to be applied to films and the antistatic for imparting an antistatic property to films have heretofore been conducted separately and individually.

It necessitates complicated procedures to accomplish both the treatments applying to both surfaces or to the one sourface of a plastic film, separately. In these procedures there is observed a tendency that an adherence or antistatic property is reduced. For instance, in the art of photography, when a photosensitive material is prepared by forming a photosensitive layer on a plastic film, it is very important to impart an antistatic property to the film, and if this property is insufficient, when a photosensitive layer is formed on the film, photograhically undesired partial fogs, which are usually called "static marks," are readily caused to occur. In case a adherence is insufficient between the photosensitive layer and the plastic film the layer peeling is frequently brought at the development treatment. According to the conventional process adopted ordinarily in the preparation of photosensitive materials, a treatment for imparting an antistatic property is effected on one surface of a plastic film, and then an under coat is formed on the other surface of the film and a photosensitive layer is formed on the undercoat-applied surface. According to this cnventional process, however, the resulting antistatic effect is still insufficient.

Also a process comprising effecting an antistatic treatment on an undercoat-applied surface is adopted in the art. In this process, however, the undercoating effect tends to be lowered by the antistatic treatment in many cases.

SUMMARY OF THE INVENTION

This invention relates to an undercoat-applied plastic film which has an improved adherence to a material to be applied thereon and a high antistatic property. We have made extensive research works with a view to developing a plastic film which can overcome the above-mentioned defects of the conventional techniques, and have now found that an undercoat-applied plastic film comprising a plastic film substrate and an undercoat layer applied on at least one surface of the plastic film, said undercoat being formed by treating the film surface with a solution or dispersion containing a specific water-soluble high molecule compound and a solvent or swelling agent for said plastic film.

It is therefore a primary object of this invention to provide an undercoat-applied plastic film which has a high antistatic property and an improved adherence to a material to be applied thereto. Another object of this invention is to provide an undercoat-applied plastic film which is excellent in that when it is used as a film base of a photosensitive material or a photoconductive layer which is formed directly or indirectly through an intermediate layer on the film base, a good adherence is obtained between the photosensitive layer and the film base and occurrence of static marks by electrification can be effectively prevented.

Other objects and advantages of this invention will be apparent from the description given hereinbelow.

DETAILED DESCRIPTION OF THE INVENTION

In accordance with this invention, there is provided an undercoat-applied plastic film comprising a plastic film substrate and an undercoat layer applied on at least one surface of the plastic film substrate, said undercoat layer being formed by treating the film surface with a solution or dispersion containing a water-soluble high molecule compound expressed by the following general formula

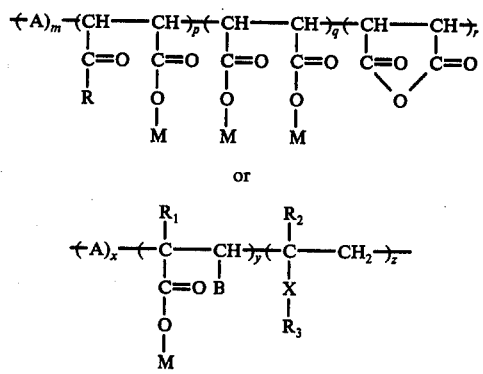

Wherein A stands for a vinyl monomer; B stands for hydrogen,

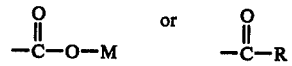

hydrogen or a cation:
R is a goup —O—R' or

in which R' stands for an alkyl, or aryl group or a heterocyclic ring residue, or R' is a mon-metallic atom necessary for forming a heterocyclic ring together with R", and R" stands for hydrogen or a lower alkyl group, or R" is a non-metallic atom necessary for forming a heterocyclic ring together with R'; $R_1$ and $R_2$ stand for hydrogen or a lower alkyl group:
X is

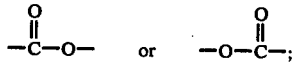

$R_3$ stands for a halogenoalkyl or halogenoalkyloxyalkyl group; and $m, p, q, r, x, y,$ and $z$ are vlues indicating mole percents or monomers, $m$ being 40–60, $p$ being 0–60, $q$ being 0–50, $r$ being 0–5 $x$ being 0–70, $y$ being 20–80, $z$ bing 0–80, with the proviso that these values satisfy the following requirements $m + p + q + r = 100$, and $x + y + z = 100$, and a solvent or swelling agent for saud plastic film.

As the vinly monomer A in the above general formula, there may be menntioned, for example, styrene; styrene substituted by nitro, fluorine, chlorine, bromine, a chloromethyl or lower alkyl group or other substituent; vinyl methyl ether; vinyl ethyl ether; vinyl chloroethyl ether; vinyl acetate; vinyl chloroacetate; vinyl propionate; acrylic, methacrylic acids; or itaconicacid; alkyl acrylates and methacrylates having 1 to 5 carbon atoms in the alkyl moieth, which may optionally be substituted by chlorine, a phenyl group or other substituent; phenyl acrylate and phenyl methacrylate; acrylonitrile; vinyl chloride; vinylidene chloride; ethylene; acrylamide; acrylamide substituted by an alkyl group of 1 to 5 carbon atoms, chlorine, a phenyl group or other substituent; vinyl alcohol; glycidyl acrylate; acrolein; and the like.

Preferably examples of the vinyl monomer A include styrene, substituted styrene, vinyl acetate, vinyl methyl ether, alkyl acrylates and acrylonitrile.

Alkyl groups having 1 to 24 carbon atoms are preferred as the alkyl $R'$ in the above general formula. They may be any of straight-chain alkyl groups, branched alkyl groups and cycloalkly groups. This alkyl group may optionally be substituted by such substitiuent as a hydroxy group a hydroxycarbonyl group, an oxycarbonyl group of a cation, etc. Especially good results can be obtained when the alkyl group $R'$ is substituted by a halogen atom such as fluorine, namely when the alkyl group $R'$ is a halogenoalky or halogenoalkyloxyalkyl group. In this case, the alkyl group $R'$ is a halogenolkyl, halogenoalkyloxyalkyl or halogenocycloalkyl group having 2 to 18 carbon atoms, and the number of the halogen substituents is preferably within a range of from 1 to 37.

Such halogenoalkyl or halogenoalkyloxyalkyl group and the halogenoalkyl or halogenoalkyloxyalkyl group as $R_3$ in the above general formula are preferably expressed by the following general formula (A):

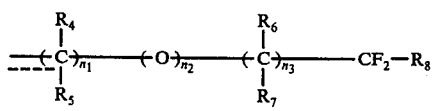

wherein $R_4$, $R_5$, $R_6$, $R_7$, and $R_8$ stand for hydrogen or fluorine; $n_2$ is 0 or 1; when $n_2$ is 0, $n_1$ is 0; when $n_2$ is 1, $n$ is 2 or 3; $n_3$ is an integer of from 1 to 17, with the proviso that the sum of $n_1$ and $n_3$ is within a range of from 1 to 17; when two or more of $R_4$ are present in the structure, they may be different in kind, for instance, one being hydrogen and the other being fluorine; and as regards each of $R_5$, $R_6$ and $R_7$, when a plurality of such groups are present in the structure, they may be different in the structure, they may be different in the kind as mentioned with respect to $R_4$.

In case $R'$ is such a halogenoalkyl or halogenoalkyloxyalkyl group as mentioned above, it is preferred that R in the above general formula is $-O-R'$. In addition, $R'$ can be an aryl group such as a phenyl group, or an aralkyl group such as a benzyl group.

Such aryl or aralkyl group may optionally have such substituents as a halogen atom, e.g., fluorine, chlorine and bromine, and a lower alkyl group, a hydroxyl group, a hydroxycarbonyl group, an oxycarbonyl group of a cation, a nitrile group, a nitro group, etc.

Either the heterocyclic ring as $R'$ in the above general formula or the heterocyclic ring formed by $R'$ and $R''$ in the above general formula is a saturated or unsaturated heterocyclic ring containing oxygen, sulfur and or nitrogen. For instance, such heterocyclic ring is selected from aziridine, pyrrole, pyrrolidine, pyrazole, imidazole, imidazoline, triazole, piperidine, piperazine, oxazine, morpholine and thiazine rings. As the cation M in the above general formula, there may be exemplified ammonium ion, sodium ion, potassium ion, lithium ion and the like. In this invention it is desired that more than 10% of the total $m$'s contained in the water-soluble high molecule compound are substituted by such cations as exemplified above.

Water-soluble high molecule compounds expressed by the above general formula may be used singly, or they may be used in the form of admixtures of two or more of them. It is preferred that these water-soluble high molecule compounds have an average molecular weight ranging from about 500 to about 500,000. Typical instances of the water-soluble high molecule compound of the above general formula to be used in this invention are as follows:

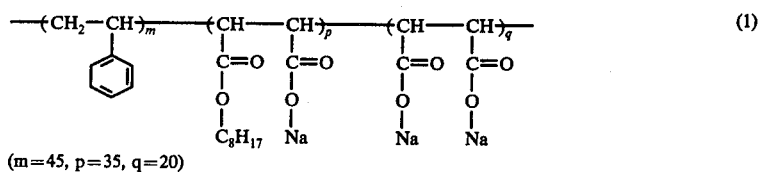

(m=45, p=35, q=20)

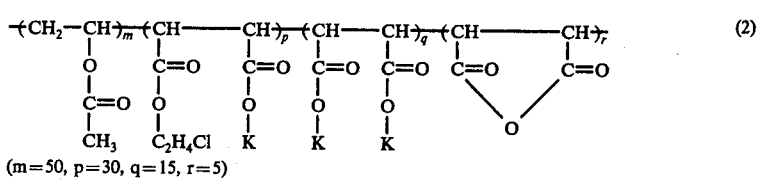

(m=50, p=30, q=15, r=5)

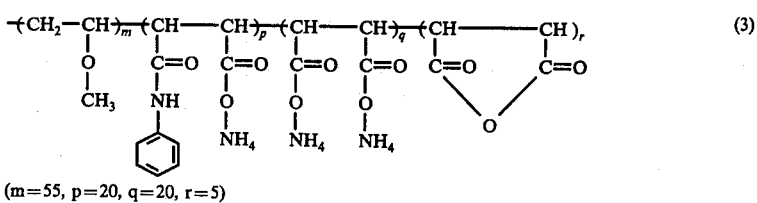

(m=55, p=20, q=20, r=5)

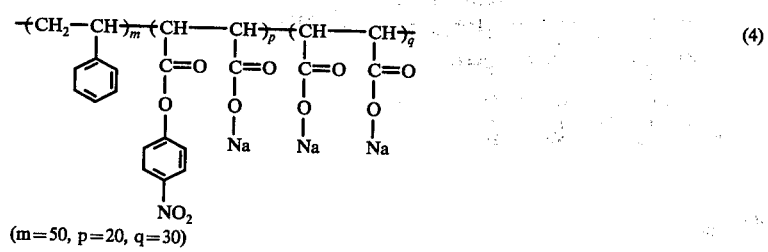
(4)
(m=50, p=20, q=30)
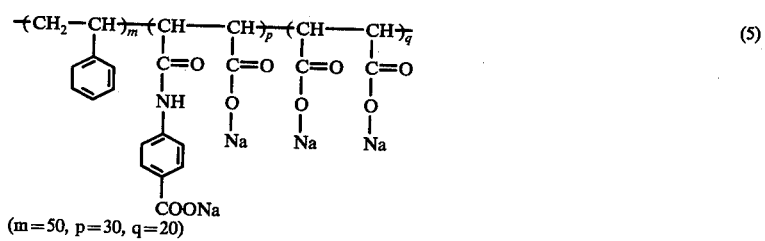
(5)
(m=50, p=30, q=20)
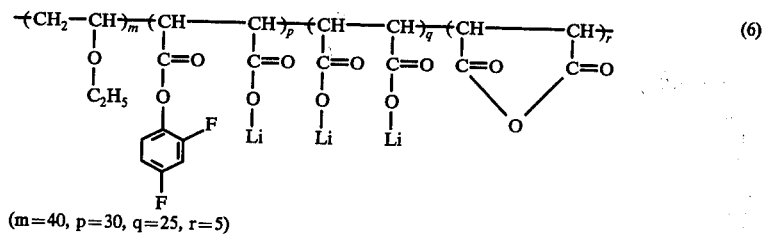
(6)
(m=40, p=30, q=25, r=5)
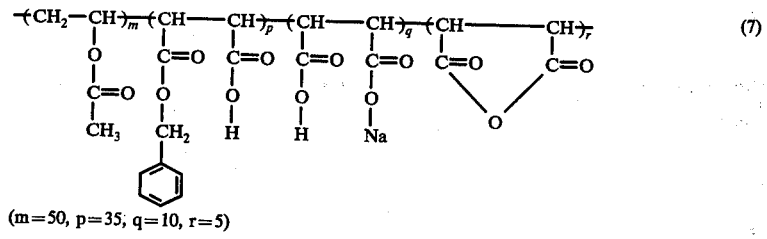
(7)
(m=50, p=35, q=10, r=5)
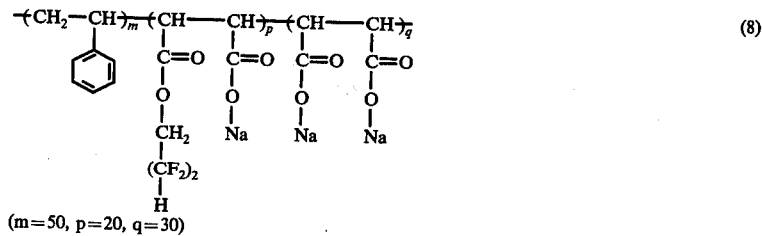
(8)
(m=50, p=20, q=30)
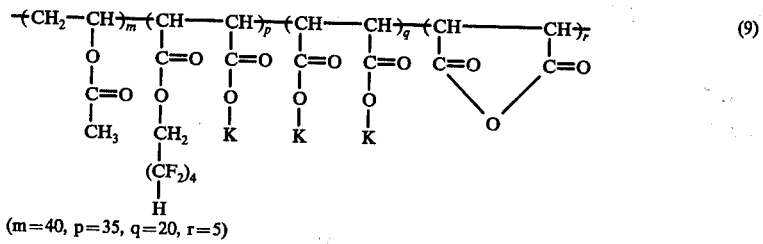
(9)
(m=40, p=35, q=20, r=5)
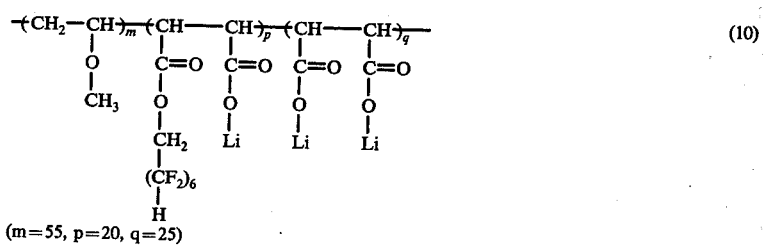
(10)
(m=55, p=20, q=25)

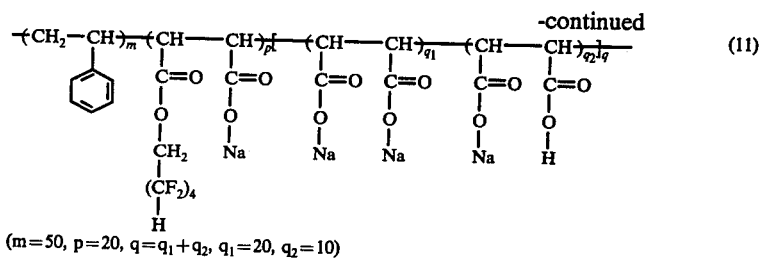
(11)
(m=50, p=20, q=q₁+q₂, q₁=20, q₂=10)
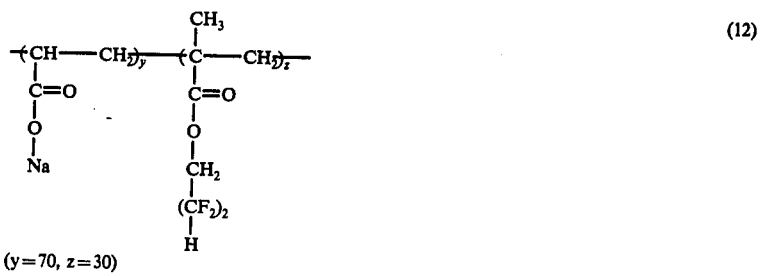
(12)
(y=70, z=30)
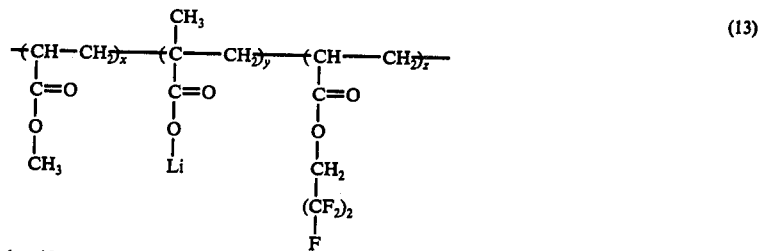
(13)
(x=10, y=60, z=30)
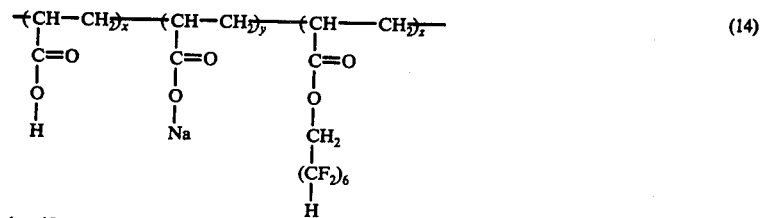
(14)
(x=10, y=60, z=30)
(15)
(y=35, z=65)
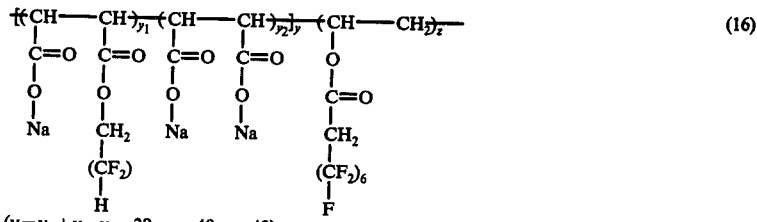
(16)
(y=y₁+y₂, y₁=20, y₂=40, z=40)
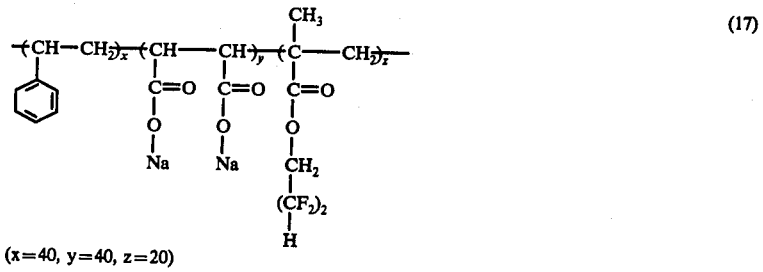
(17)
(x=40, y=40, z=20)

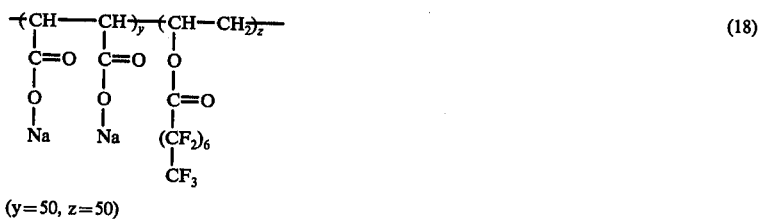
(18)
(y=50, z=50)
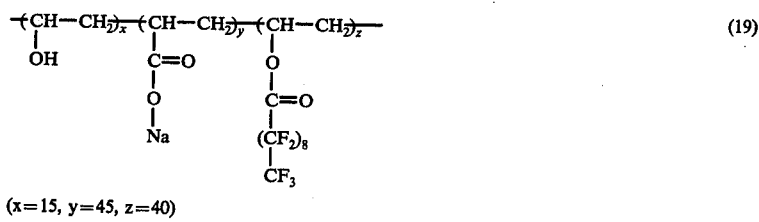
(19)
(x=15, y=45, z=40)
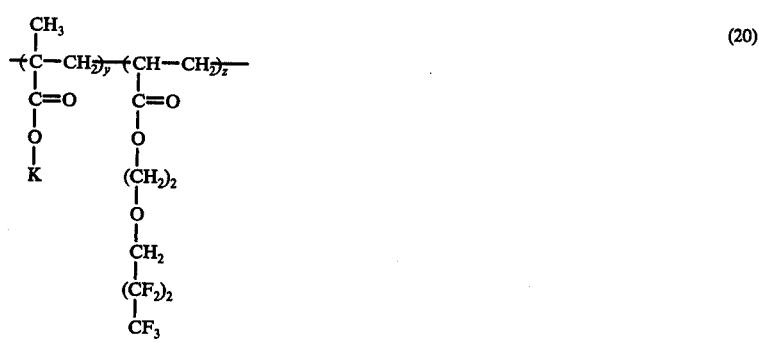
(20)
(y=60, z=40)
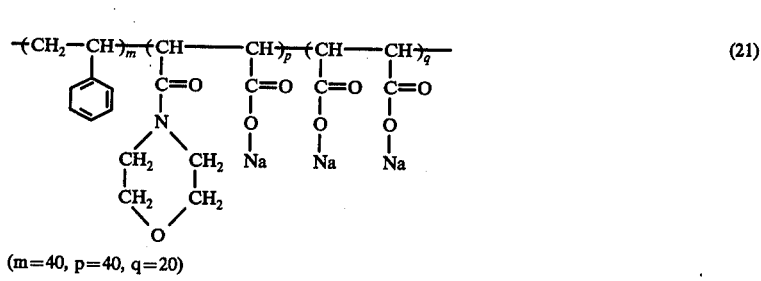
(21)
(m=40, p=40, q=20)
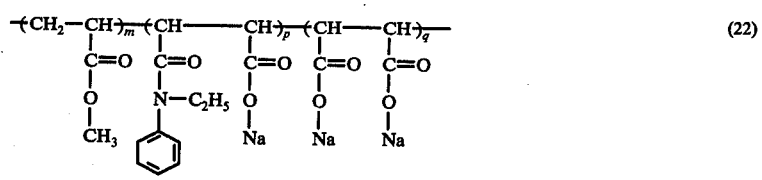
(22)
(m=40, p=50, q=10)
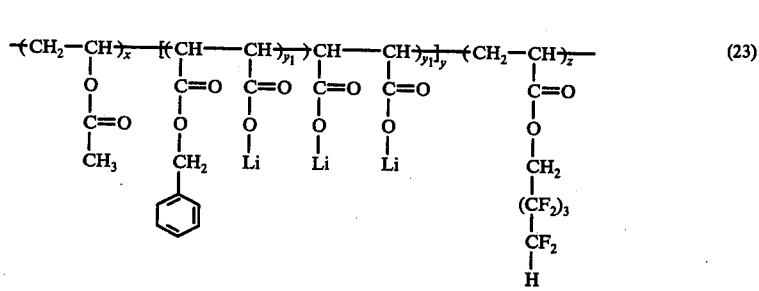
(23)
(x=40, y=y$_1$+y$_2$, y$_1$=20, y$_2$=20, z=20)

-continued
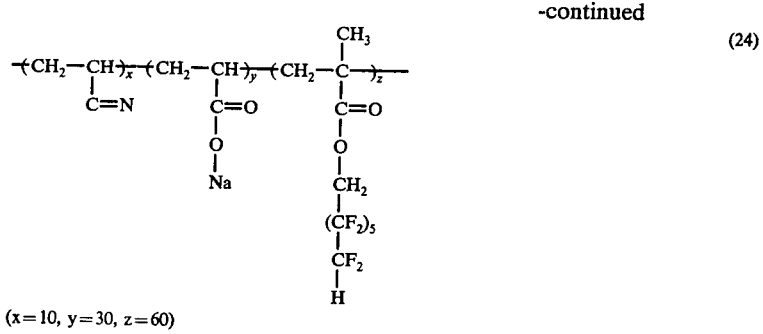
(x=10, y=30, z=60)
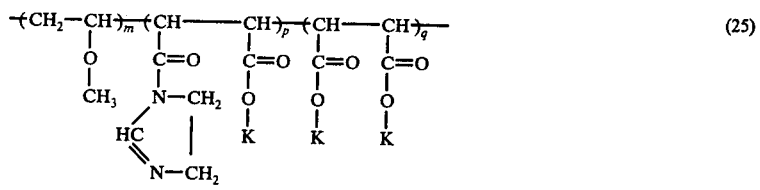
(m=40, p=50, q=10)
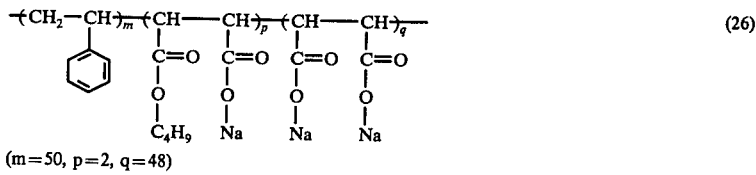
(m=50, p=2, q=48)
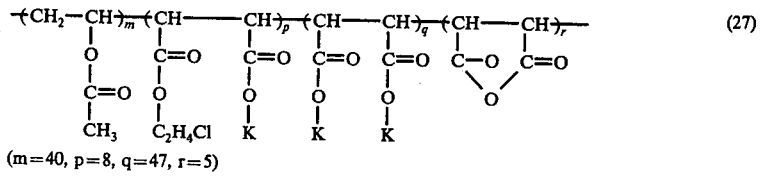
(m=40, p=8, q=47, r=5)
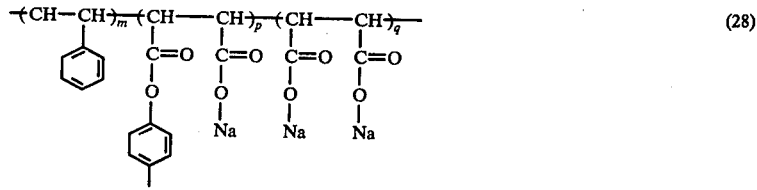
(m=50, p=1, q=49)
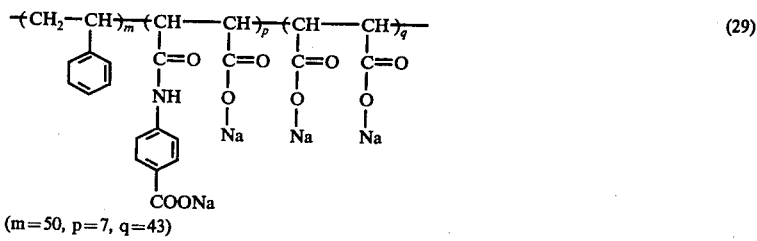
(m=50, p=7, q=43)
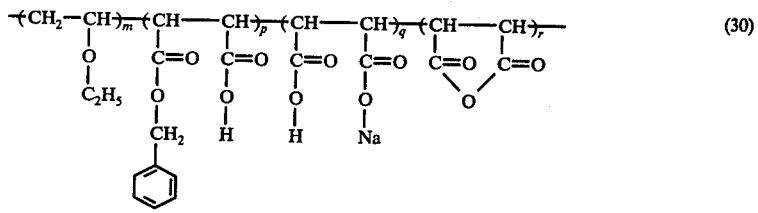
(m=50, p=9, q=36, r=5)

-continued
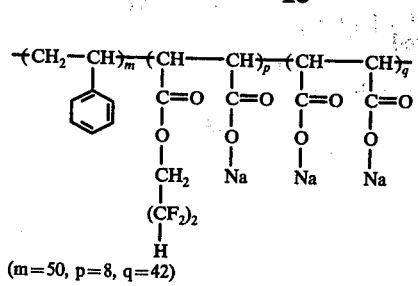
(31)
(m=50, p=8, q=42)
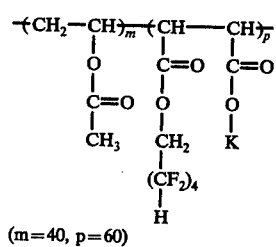
(32)
(m=40, p=60)
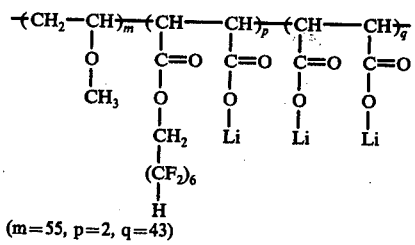
(33)
(m=55, p=2, q=43)
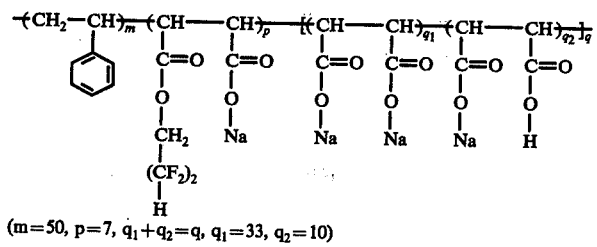
(34)
(m=50, p=7, $q_1+q_2=q$, $q_1=33$, $q_2=10$)
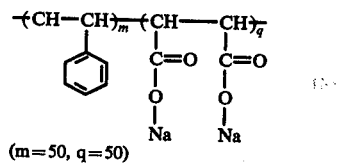
(35)
(m=50, q=50)
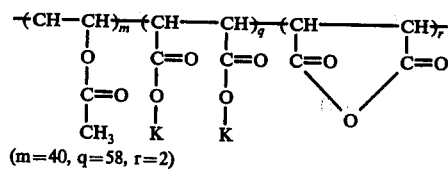
(36)
(m=40, q=58, r=2)
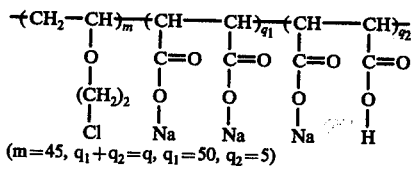
(37)
(m=45, $q_1+q_2=q$, $q_1=50$, $q_2=5$)
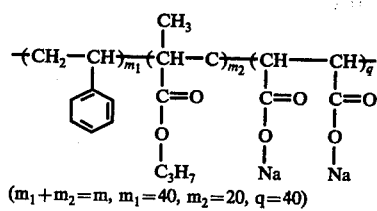
(38)
($m_1+m_2=m$, $m_1=40$, $m_2=20$, q=40)

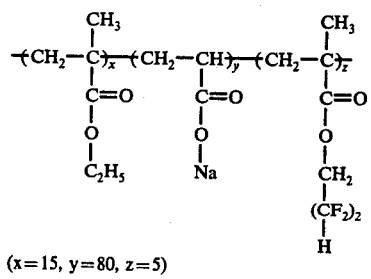
(39)
(x=15, y=80, z=5)
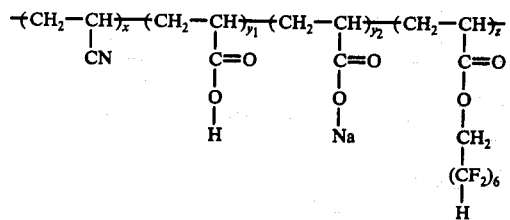
(40)
(x=45, $y_1+y_2=y$, $y_1=10$, $y_2=40$, z=5)
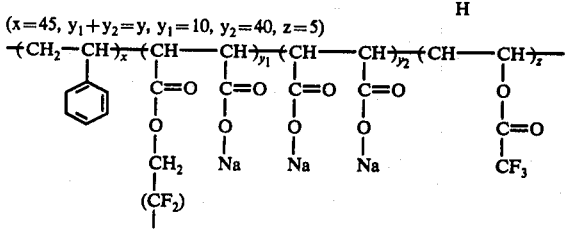
(41)
(x=50, $y_1+y_2=y$, $y_1=30$, $y_2=18$, z=2)
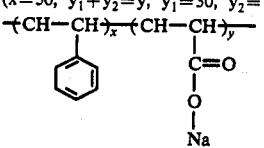
(42)
(x=30, y=70)
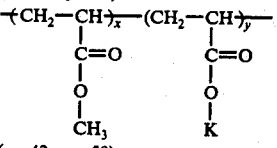
(43)
(x=42, y=58)
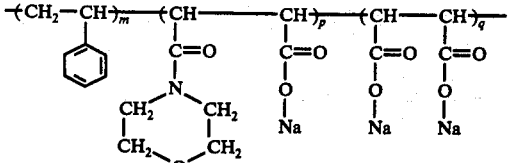
(44)
(m=55, p=2, q=43)
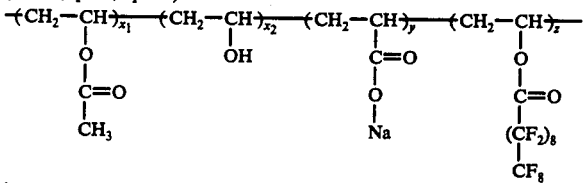
(45)
($x_1+x_2=x$, $x_1=16$, $x_2=35$, y=45, z=4)
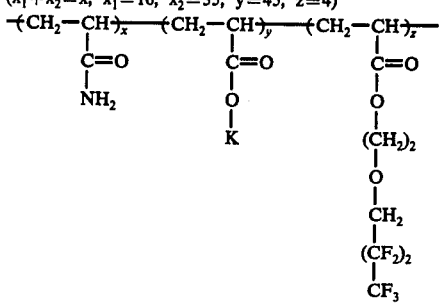
(46)

(x=31, y=60, z=9)

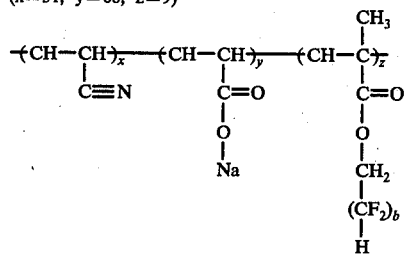

(47)

(x=27, y=70, z=3)

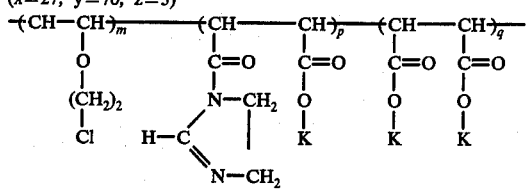

(48)

(m=45, p=5, q=50)

Water-soluble high molecule compounds of the above general formula to be used in this invention can be synthesized by known methods. As is well known in the art, maleic anhydride copolymeers are very common polymers, and their derivatives may readily be formed by reacting a maleic anhydride copolymer with an appropriate alcohol or amine, or by reacting in advance maleic anhydride with an appropriate alcohol or amine to thereby synthesize a maleic acid ester or amide, and then couducting the copolymerization. Further, halogenoalkyl acrylates, halogenoalkyloxyalkyl acrylated and the like can readily be prepared by methods for preparing monomers and polymes, which are disclosed in "Journal of Polymer Science, 15, 515-574 (1955)" or the specification of British Pat. No. 1,121,357. Solvents and swelling agents for plastic films to be used as the substrate, but in general, the following compounds are conveniently used; resorcinol, orcinol, β-resorcylic acid pyrogallol, catechol, hydroquinone, α-naphthol, phenol, cresol, pchlorophenol, salicylic acid, nitrobenzoic acid, acetone, methylethylketone, methylenes chloride, chloral hydrate, toluene, acetophenone, anisole, ethylene, chlorohydrin, ethylene carbonate, butylene chloride, dimethyl formamide, dimethyl sulfoxide, etc. More specifically, in case the plastic film is a film of a polyester or polyether containing aromatic carbonyl groups, it is preferable to employ such compounds as resorcinal, acetophenone, salicylic acid, anisole, dimethyl formamide and dimethyl sulfoxide.

In the case of a polycarbonate film, butylene chloride, resorcinol, dimethyl sulfoxide and the like are preferably used. Further, in the case of a polystyrene film, such compounds as acetophenone are preferred, and in the case of a cellulose ester film, such compounds as acetone and methylethylketone are preferably used. These compounds are suitably chosen depending on the kind of the plastic film, and they may be used singly or in the form of admixtures of two or more of them. The plastic film to be used as the substrate in this invention includes, for example, films of polyesters or polyethers having aromatic carbonyl groups, films of polycarbonates having aromatic groups, polystyrene films, and films of cellulose esters such as cellulose triacetate and cellulose acetate propionate. A treating sloution to be applied on the surface of such plastic film for forming an undercoat layer is a solution or dispersion containing the water-soluble high molecule compound expressed by the above genral formula and the solvent or swelling agent for the plastic film, such as exemplified above. In general, water is used as a solvent or dispersion medium of such treating solution and it is possible to employ an organic solvent in combination with water. In the letter case, use of an organic solvent having a good compatibility with water is desired. For instance, methanol, ethanol, acetone, dioxane and the like are preferably used. It is possible to incorporate in such treating solution various additives such as hardening agents, matting agents, anti-blocking agents, surfactants, dyes, high molecule compounds, lubricants, etc. appropriately depending on the intended use of the resulting film. An example of preferred treating solution to be used in this invention has the following composition;

| | |
|---|---|
| Water-soluble high molecule compound of the above general formula | 0.1–30% by weight |
| Solvent or swelling agent for plastic film | 0.5–25% by weight |
| water | 0.1–99.4% by weight |
| organic solvent | 0–99.3% by weight |
| additives | suitable amount |

Such treating solution is applied to at least one surface of the plastic film. The treating liquid is applied in a thin thickness uniformly on the film surface by any of customary methods such as dipping coating, spray-coating and the like, and the applied solution is then dried to form an undercoat layer on the film surface. It is preferred that the treating solution is applied in such an amount that the film surface contains the water-soluble high molecule compound in an amount of 0.01 to 5 g per square meter of the film surface. The treated surface of the surface-treated plastic film of this invention has, in general, a surface specific resistivity of $10^7$ to $10^{12} \Omega$ cm as measured at a temperature of 20° C. and a relative humidity of 50%. Thus, the treated surface of the plastic film of this invention has a relatively high conductivity, and electrification is not caused to occur in the undercoat-applied plastic film of this invention, even when it has a frictional contact with other material or it is touched with other material, or when parts of the film per se have a frictional contact with each other or peeling is brought about in the film. Furthermore, the undercoat-applied plastic film of this invention has an excellent adherence to a material to be appled thereto, for instance, gelatin. Thus, excellent undercoating effects can be attained in this invention. Especially when the undercoat-applied plastic film of this invention is used as a film base for a photosensitive material and a photosensitive layer is formed directly or indirectly through an intermediate layer on the film base, it is possible to prevent occurrence of static marks by electrification and to obtain a good adherence between the photosensitive layer and the film base. Further, when the undercoat-applied plastic film of this invention is used, no problem is brought about as regards photographic characteristics (for instance, occurrence of such undesired phenomena as reduction of sensitivity and occurrence of fogs can be prevented).

In some kinds of materials to be bonded, it is possible to subject the treating solution to corona discharge treatment, ultraviolet radiation treatment, flame treatment and the like before or after the treating solution is applied to the surface of the plastic film and the material to be applied thereto can be stabilized and heightened by such treatments without degradation of the antistatic property of the treated surface of the film.

In addition to the above-materials, diazo-type photosensitive materials and the like can be bonded to the undercoat-applied plastic film of this invention.

Still further, it is possibsle to adhesive two sheets of undercoat-applied plastic films of this invention to each other to obtain a layer structure excellent in antistatic characteristics and adherence.

As described above, in accordance with this invention, undercoat-applied plastic films having such excellent properties as mentioned above can be provided very easily, and it is possible to impart a good adherence even to a film very poor in bondability to a material to be applied, such as a stretched crystalline film of a polyester having aromatic carbonyl groups.

This invention will now be illustrated in more details by reference to Examples, but the scope of this invention is not at all limited by these Examples.

EXAMPLE 1

A treating liquid formed by dissolving an aqueous solution of 0.5 g of a water-soluble high molecule compound indicated in Table 1 in 5 cc of water into 96cc of methanol containing 4 g of resorcinol was coated on one surface of a biaxially stretched, blue-colored polyethylene terephthalate film having a thickness of 175$\mu$ at a rate of 20m/min by means of a roll coater, and it was dried at 100° C. for 2 minutes. The same treatment was effected on the other surface of the above plastic film. Thus, a film on both surfaces of which undercoat layers were formed was obtained.

Then, a X-ray emulsion containing silver iodide-bromide was coated on one surface of the film according to a customary procedure just after the corona discharge treatment or directly without conducting the corona discharge treatment, to obtain a test sample.

For comparison, a polyethylene terephthalate film was coated with a comparative treating solution comprising 2 g of a 1:1 styrene-maleic anhydride copolymer (an average molecular weight being about 10,000), 4 g of resorcinol and 96 cc of acetone in the same manner as above, and the drying and corona discharge treatments were carried out in the same manner as above, following which the same photosensitive emulsion was coated and dried to obtain a comparative sample. Each of the so obtained samples was subjected to the following tests:

Dry Adherence Test

Shallow slits were formed in squares on the emulsion layer surface of a sample with use of a razor, and a cellophane adhesive tape was applied thereon under pressure. Then, the cellophane tape was abruptly peeled percentage of the area of the remaining emulsion layer to the total area of the applied cellophane tape.

Treatment Adherence Test

Slits formed on a sample in squares in a treating surface was rubbed in a treating liquid such as a developer. The treatment adherence was expressed in terms of the percentage of the area of the remaining emulsion layer to the whole treated area.

Scratch Test

An emulsion-trated sample was placed in water, and a needle having a round point on which a load was imposed was imposed was vertically stuck into the sample.

In this state the sample was moved in the horizontal direction and the load under which the scar by the needle reached the undercoat layer was measured. The scratch strength was expressed in terms of this load in gram.

Static Mark Test

In a dark room maintained at a temperature of 25° C. and a relative hunidity of 40%, a sample was moved on a roller of rubber, chromium or nylon moving at a rate synchronized with the moving rate of the film in such a manner that the back surface of the sample film has a contact with the roller surface. Then, the sample was subjected to the developing treatment, and the state of occurrence of static marks was examined. The state in which no static mark was formed was designated as A, and the state in which static marks were so dense as to give an almost entirely blackened surface was designated as E. The ranks A, B, C, D, and E were rated by dividing equally the difference between the above two states.

In case the value of the film adherence is 80% or higher, the practical application includes no problem.

The above-mentioned corona discharge treatment was conducted by passing the sample at a rate of 40 m/min through a corona discharge apparatus operated at 1.0 A and 450 W.

Results of the above tests are shown in Table 1 given below.

Table

| Sample No. | High Molecule Compound | Corona Discharge Treatment | Dye Adherence | Treatment Adherence | Scratch | Static |
|---|---|---|---|---|---|---|
| 1 | exemplified compound (1) having an average molecular weight of about 16000 exemplfied compound (4) having an average | NOT | 100 | 90 | 250 | B |

Table-continued

| Sample No. | High Molecule Compound | Corona Discharge Treatment | Dye Adherence | Treatment Adherence | Scratch | Static |
|---|---|---|---|---|---|---|
| 2 | molecular weight of about 15000 | NOT | 100 | 90 | 250 | A |
| 3 | exemplified compound (5) having an average molecular weight of about 15000 | NOT | 100 | 100 | 300 | A |
| 4 | exemplified compound (26) having an average molecular weight of about 13000 | NOT | 100 | 100 | 300 | B |
| 5 | exemplified compound (28) having an average molecular weight of about 18000 | NOT | 100 | 90 | 250 | A |
| 6 | exemplified compound (29) having an average molecular weight of about 14000 | NOT | 100 | 100 | 350 | A |
| 7 | exemplified compound (1) having an average molecular weight of about 16000 | DO | 100 | 100 | 350 | A |
| 8 | exemplified compound (4) having an average molecular weight of about 15000 | DO | 100 | 100 | 400 | A |
| 9 | exemplified compound (5) having an average molecular weight of about 15000 | DO | 100 | 100 | 400 | A |
| 10 | exemplified compound (26) having an average molecular weight of about 13000 | DO | 100 | 100 | 350 | A |
| 11 | exemplified compound (28) having an average molecular weight of about 18000 | DO | 100 | 100 | 400 | A |
| 12 | exemplified compound (29) having an average molecular weight of about 14000 | DO | 100 | 100 | 450 | A |
| | Styrene-maleic anhydride copolymer (comparison) | DO | 100 | 100 | 250 | D |

From the data shown in Table 1, it will readily be understood that undercoat applied plastic films of this invention are excellent in not only the adherence between the film surface and the material to be applied and the antistatic characteristics. It is also apparent that the scratch strength can be improved by the corona discharge treatment.

EXAMPLE 2

A treating solution obtained by dissolving a solution of 0.7 g of a water-soluble high molecule compound indicated in Table 2 in 5 cc of water into 90 cc of a methanol solution containing 10cc of acetophenone was coated on one surface of a stretched, white-colored polystyrene film at a rate of 10 m/min by means of a roll coater, and it was treated in the same manner.

A silver chloride-bromide positive emulsion of a low sensitivity was coated on the above film according to a customary method after the corona discharge treatment or directly without conducting the corona discharge treatment, and it was dried to obtain a test sample.

For comparison, 1.5g of a 1:1 styrene-maleic anhydride copolymer having an average molecular weight of about 20,000 was dissolved in 100cc of an acetone solution containing 5 cc of dimethyl sulfoxide and 10cc of acetophenone, and a polystyrene film was treated with the resulting treating liquid to obtain a comparative sample.

Each sample was subjected to the same dry adherence test, treatment adherence test, strength test and static mark test as described in Example 1, to obtain results shown in Table 2.

The corona discharge treatment in this Example was carried out by passing the sample at a rate of 30m/min through a corona discharge apparatus operated at 1.5 A and 450 W.

| Sample No. | High Molecule Compound | Corona Discharge Treatment | Dry Adherence | Treatment Adherence | Scratch | Static |
|---|---|---|---|---|---|---|
| 14 | exemplified compound (9) having an average molecular weight of about 30,000 | NOT | 90 | 100 | 250 | A |
| 15 | exemplified compound (11) having an average molecular weight of about 25,000 | "100 | 100 | 200 | A |  |
| 16 | exemplified compound (13) having an average molecular weight of about 33,000 | " | 90 | 90 | 200 | A |
| | exemplified compound | | | | | |

-continued

| Sample No. | High Molecule Compound | Corona Discharge Treatment | Dry Adherence | Treatment Adherence | Scratch | Static |
|---|---|---|---|---|---|---|
| 17 | (40) having an average molecular weight of about 25,000 | " | 100 | 90 | 250 | A |
| 18 | exemplified compound (32) having an average molecular weight of about 20,000 | " | 90 | 100 | 300 | A |
| 19 | exemplified compound (41) having an average molecular weight of about 28,000 | " | 100 | 100 | 350 | A |
| 20 | exemplified compound (9) having an average molecular weight of about 30,000 | " | 100 | 100 | 300 | A |
| 21 | exemplified compound (11) having an average molecular weight of about 25,000 | " | 100 | 100 | 250 | A |
| 22 | exemplified compound (13) having an average molecular weight of about 33,000 | " | 100 | 100 | 350 | A |
| 23 | exemplified compound (40) having an average molecular weight of about 25,000 | " | 100 | 100 | 300 | A |
| 24 | exemplified compound (32) having an average molecular weight of about 25,000 | " | 100 | 100 | 350 | A |
| 25 | exemplified compound (41) having an average molecular weight of about 28,000 | " | 100 | 100 | 450 | A |
| 26 | Styrene-maleic anhydride copolymer (comparative sample) | " | 100 | 100 | 250 | E |

From the results shown in Table 2, it will readily be understood that undercoat-applied plastic films of this invention are excellent in adherence and antistatic characteristics.

EXAMPLE 3

0.8 g of a water-soluble high molecule compound indicated in Table 3 was dissolved in 8 cc of water, and the solution was added to 92 cc of a methanol solution containing 15cc of methylethylketone. The resulting treating solution was coated on both surfaces of a cellulose triacetate film having a thickness of 120μ bymeans of a roll coater, and it was dried at 80° C. for 2 minutes.

For comparison, the surface of a cellulose triacetate film same as above were hydrolyzed to obtain a hydrolyzed comparative sample, and a cellulose triacetate film same as above was treated with a treating solution obtained by dissolving 1 g of a 1:1 vinyl acetate-maleic anhydride copolymer having an average molecular weight of about 47,000 in a mixed solvent of 30 cc of acetone and 70 cc of methanol, in the same manner 30 cc of acetone and 70cc of methanol, in the same manner as described above to obtain another comperative sample. A panchromatically sensitized emulsion of the Lith type composed mainly of silver bromide was coated to each sample after application of a backcoat gelatin layer of a thickness of 4μ incorporated with a dye or without applying such backcoat gelatin layer.

Each of the so treated samples was subjected to the same tests as described in Example 1 to obtain results shown in Table 3.

Table 3

| Sample No. | High Molecular Compound | Backcoat Layer | Dry Adherence | Treatment Adherence | Scratch | Static Mark |
|---|---|---|---|---|---|---|
| 27 | exemplified compound (2) having an average molecular weight of about 50,000 | not applied | 100 | 90 | 300 | A |
| 28 | exemplified compound (2) having an average molecular weight of about 50,000 | applied | 100 | 90 | 300 | A |
| 29 | exemplified compound (3) having an average molecular weight of about 52,000 | not applied | 90 | 90 | 250 | A |
| 30 | exemplified compound (3) having an average molecular weight of about 52,000 | applied | 90 | 90 | 250 | A |
| 31 | exemplified compound (6) having an average molecular weight of about 60,000 | not applied | 100 | 100 | 350 | A |
| 32 | exemplified compound (6) having an average molecular weight of about 60,000 | applied | 100 | 100 | 350 | A |
| 33 | exemplified compound (36) having an average molecular weight of about 60,000 exemplified compound (27) | not applied | 90 | 90 | 200 | A |

Table 3-continued

| Sample No. | High Molecular Compound | Backcoat Layer | Dry Adherence | Treatment Adherence | Scratch | Static Mark |
|---|---|---|---|---|---|---|
| 34 | having an average molecular weight of about 60,000 exemplified compound (35) | applied | 100 | 90 | 250 | A |
| 35 | having an average molecular weight of about 8,000 exemplified compound (35) | not applied | 100 | 90 | 200 | A |
| 36 | having an average molecular weight of about 8,000 exemplified compound (36) | applied | 100 | 100 | 250 | A |
| 37 | having an average molecular weight of about 5,5000 exemplified compound (36) | not applied | 90 | 90 | 200 | A |
| 38 | having an average molecular weight of about 5,5000 exemplified compound (37) | applied | 100 | 90 | 250 | A |
| 39 | having an average molecular weight of about 13,000 exemplified compound (37) | not applied | 100 | 100 | 300 | A |
| 40 | having an average molecular weight of about 13,000 | applied | 100 | 100 | 300 | A |
| 41 | vinyl acetate-maleic anhydride copolymer (comparison) | not applied | 100 | 50 | 100 | E |
| 42 | Vinyl acetate-maleic anhydride copolymer (comparison) | applied | 100 | 50 | 100 | C |

From the results shown in Table 3, it will readily be understood that undercoat-applied plastic films of this invention have an excellent adherence and exhibit an excellent antistatic effect.

A silver iodide-bromide X-ray emulsion for was applied on one surface of each of the so treated samples, and it was dried. The samples were subjected to the same tests as described in Example 1 to obtain the results shown in Table 4.

Table 4

| Sample No. | High molecule Compound | Dry Adherence | Treatment Adherence | Scratch | Static Mark |
|---|---|---|---|---|---|
| 43 | exemplified compound (8) having an average molecular weight of about 98,000 | 100 | 100 | 250 | A |
| 44 | exemplified compound (10) having an average molecular weight of about 80,000 | 90 | 100 | 250 | B |
| 45 | exemplified compound (12) having an average molecular weight of about 100,000 | 100 | 90 | 250 | A |
| 46 | exemplified compound (31) having an average molecular weight of about 80,000 | 100 | 100 | 250 | A |
| 47 | exemplified compound (31) having an average molecular weight of about 50,000 | 90 | 90 | 200 | B |
| 48 | exemplified compound (39) having an average molecular weight of about 150,000 | 100 | 100 | 350 | A |
|  | styrene-maleic anhydrode copolymer (comparison) | 20 | 80 | 150 | E |

EXAMPLE 4

A treating liquid obtained by dissolving 0.5 g of a water-soluble high molecule compound indicated in Table 4 in 3 cc of water and incorporating the solution into a 97 cc of methanol solution containing 5 g of resorcinol and 15 cc of dioxane was coated at a rate of 15m/min by means of a customary roll coater on one surface of a biaxially stretched, blue-colored polyethylene terephthalate film having thickness of 175μ, and dried at 105° C. Then, the other surface of the film was treated in the same manner as above.

For comparison, a treating solutin comprising 2 g of a 1:1 styrene-maleic anhydride copolymer haveng an average molecular weight of about 85,000, 5 g of resorcinol and 96 cc of acetone was coated in the same manner as above on both surfaces of a polyethylene terephthalate film same as above, to obtain a comparative sample.

Also from the results shown in Table 4, it will readily be understood that undercoat-applied plastic films of this invention have an excellent adherence to a material to be applied thereto, and exhibit a high antistatic effect.

EXAMPLE 5

0.5 g of a water-soluble high molecule compound indicated in Table 5 was dissolved in 5 cc of water and the solution was incorporated in 95 cc of a methanol solution containing 4 g of resorcinol. In the same manner as in Example 1, the resulting treating liquor was coated on a polyester film having a thickness of 175μ and dried. Then, the film was subjected to the corona discharge treatment in the same manner as described in Example 1.

A panchromatic color emulsion was coated on one surface of each of the so treated film samples according to a customary method. The resulting samples were subjected to the same tests as described in Example 1 to obtain results shown in Table 5.

Table 5

| Sample No. | High Molecule Compound | Dry Adherence | Treatment Adherence | Scratch | Static Mark |
|---|---|---|---|---|---|
| 50 | exemplified compound (1) having an average molecular weight of about 6,000 | 100 | 100 | 250 | A |
| 51 | exemplified compound (2) having an average molecular weight of about 8,500 | 100 | 100 | 200 | A |
| 52 | exemplified compound (5) having an average molecular weight of about 9,000 | 100 | 100 | 250 | A |
| 53 | exemplified compound (26) having an average molecular weight of about 13,000 | 100 | 100 | 300 | A |
| 54 | exemplified compound (27) having an average molecular weight of about 7,000 | 100 | 100 | 250 | A |
| 55 | exemplified compound (29) having an average molecular weight of about 14,000 | 100 | 100 | 300 | A |

EXAMPLE 6

A treating liquid having a composition same as described in Example 4 and containing a water-soluble high molecule compound indicated in Table 6 was coated on a biaxially stretched of 100μ in the same manner as described in Example 4. Then, the coated film was subjected to the corona discharge treatment in the same manner as described in Example 1. A panchromatic color emulsion was coated on one surface of the so treated film sample according to a customary method, and the same tests as described in Example 1 were conducted to obtain results shown in Table 6.

Table 6

| Sample No. | High Molecular Compound | Dry Adherence | Treatment Adherence | Scratch | Static Mark |
|---|---|---|---|---|---|
| 56 | exemplified compound (56) having an average molecular weight of about 75,000 | 100 | 90 | 250 | A |
| 57 | exemplified compound (15) having an average molecular weight of about 12,000 | 80 | 100 | 200 | A |
| 58 | exemplified compound (16) having an average molecular weight of about 15,000 | 100 | 100 | 250 | A |
| 59 | exemplified compound (17) having an average molecular weight of about 11,000 | 100 | 100 | 150 | A |
| 60 | exemplified compound (40) having an average molecular weight of about 90,000 | 100 | 90 | 200 | A |
| 61 | exemplified compound (41) having an average molecular weight of about 5,000 | 80 | 90 | 200 | B |
| 62 | exemplified compound (42) having an average molecular weight of about 3,000 | 100 | 100 | 200 | A |
| 63 | exemplified compound (43) having an average molecular weight of about 15,000 | 100 | 100 | 350 | A |

EXAMPLE 7

A treating solution having a composition same as described in Example 4 and containing a water-soluble high molecule compound indicated in Table 6 was coated on a biaxially stretched Polyethylene therephtablate film having a thickness of 50μ in the same manner as described in Example 4. Then, this film was coated with sensitive composition (coutaining diacetyl cellulose, diazo dye, coupler, citric acid and ethanol). And the same Dry Adherence tests as described in Example 1 were conducted to obtain results shown in Table 7.

For comparison vinylidene-chloride-methylacrylate-itaconic acid (65:30:15) copolymer was dissolved in 90 cc of ethylenedichloride and 10 cc of phenol solution was coated on the surface of said film it was dried. This treated film was coated with said sensitive solution.

Table 7

| Sample No. | High Molecular Compound | Dry Adherence | Flatness |
|---|---|---|---|
| 64 | exemplified compound (13) having an average molecular weight of about 5,000 | 100 | good |
| 65 | exemplified compound (18) having an average molecular weight of about 13,000 | 100 | good |
| 66 | exemplified compound (31) having an average molecular weight of about 20,000 | 100 | good |
| 67 | exemplified compound (45) having an average molecular weight of about 3,000 | 100 | good |
| | vinylidene chlarid copolymer (comparison) | 0 | bad |

From the results shown in the foregoing Examples, it will readily be understood that undercoat-applied plastic films of this invention have an excellent adherence to a material to be applied thereto and exhibit an antistatic effect. It is also apparent that these excellent films can be obtained by a very simple treatment.

What is claimed is:

1. An undercoat-applied plastic film substrate selected from the group consisting of polyester, polyether, polycarbonate and polystyrene film substrates and an undercoat layer on at least one surface of the plastic film substrate, said undercoat layer being formed by treating the surface with a solution or dispersion containing a compound represented by the following general formula:

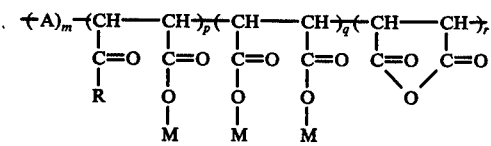

or

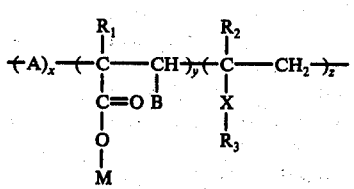

wherein A is a vinyl monomer selected from a group consisting of styrene; styrene substituted by a nitro group, fluorine, chlorine, bromine, chloromethyl or lower alkyl; vinyl methyl ether; vinyl ethyl ether; vinyl chloromethyl ether; vinyl acetate; vinyl chloroacetate; vinyl propionate; acrylic or methacrylic acids; itaconic acids; alkyl acrylates and methacrylates having 1 to 5 carbon atoms in the alkyl moiety, which alkyl group is unsubstituted or substituted by chlorine or phenyl; phenyl acrylate and phenyl methacrylate; acrylonitrile; vinyl chloride; vinylidene chloride; ehtylene, acrylamide; acrylamide substituted by an alkyl group of 1 to 5 carbon atoms, chlorine or phenyl; vinyl alcohol; glycidyl acrylate; and acrolein; B is hydrogen,

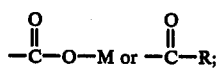

M is hydrogen, an alkali metal, or ammonium cation, at least 10% of said M's being alkali cation; R is —O—R' or

in which R' is alkyl, aralkyl, or aryl; and R" is an atomic group necessary for completing a heterocyclic ring selected from the group consisting of aziridine, pyrrole, pyrrolidine, pyrazole, imidazole, imidazoline, triazole, piperidine, piperazine, oxazine, morpholine and thiazine, $R_1$ and $R_2$ are individually hydrogen or lower alkyl, X is

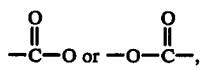

$R_3$ is a halogenoalkyl or halogenoalkoxyalkyl group, $m$ is 40 to 60, $p$ is 0 to 60, $q$ is 0 to 50, $r$ is 0 to 5, $x$ is 0 to 70, $y$ is 20 to 80 and $z$ is 0 to 80 wherein $$m + p + q + r = 100$$

$$x + y + z = 100$$

and a solvent or swelling agent for said plastic film substrate selected from resorcinol, orcinol, a β-resorcylic acid, pyrogallol, catechol, hydroquinone, α-naphthol, phenol, cresol, p-chlorophenol, salicylic acid, nitrobenzoic acid, toluene, acetophenone and anisole.

2. An undercoat-applied plastic film according to claim 1, wherein said vinyl monomer is selected from styrene, said substituted styrene, vinyl acetate, vinyl methyl ether, alkyl acrylate and acrylonitrile.

3. An undercoat-applied plastic film according to claim 1, wherein R' is selected from substituted or unsubstituted straight-chain alkyl, branched alkyl, cycloalkyl, each of said alkyls having 1 to 24 carbon atoms.

4. An undercoat-applied plastic film according to claim 1, wherein R' is an alkyl group selected from halogenoalkyl, halogenoalkyloxyalkyl and halogenocycloalkyl, said alkyl group having 2 to 18 carbon atoms and containing 1 to 37 halogen atoms.

5. An undercoat-applied plastic film according to claim 4 wherein R' is of the formula:

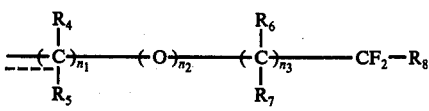

wherein $R_4$, $R_5$, $R_6$, $R_7$ individually are hydrogen or fluroine, $n_1$ is 0, 2 or 3, $n_2$ is 0 or 1, $n_3$ is 1 to 17, when either of $n_1$ or $n_2$ is 0, the other is 0; when a plurality of any one or more of each of $R_4$, $R_5$, $R_6$ or $R_7$ appears in said formula, each of said plurality can individually be hydrogen or fluorine.

6. An undercoat-applied plastic film according to claim 1, wherein $R^1$ is selected from substituted or unsubstituted, phenyl and benzyl.

7. An undercoat-applied plastic film according to claim 1, wherein $R_3$ is of the formula:

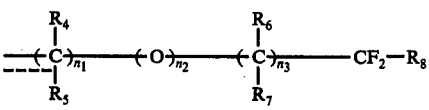

wherein $R_4$, $R_5$, $R_6$ and $R_7$ individually are hydrogen or fluorine, $n_1$ is 0, 2 or 3, $n_2$ is 0 or 1, $n_3$ is 1 to 17, when either of $n_1$ or $n_2$ is 0, the other is 0; when a plurality of any one or more of each of $R_4$, $R_5$, $R_6$, or $R_7$ appears in said formula, each of said plurality can individually be hydrogen or fluorine.

8. An undercoat-applied plastic film according to claim 1 wherein said compound is

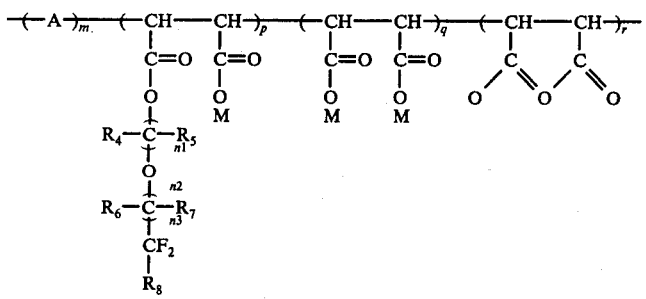

wherein A is styrene, vinyl acetate and vinyl ether; $R_4$, $R_5$, $R_6$, $R_7$ and $R_8$ are individually H or fluorine, and if a plurality of $R_4$, $R_5$, $R_6$ or $R_7$ appears on said compound, each of said plurality can individually be H or fluorine; $n1$ is 0, 2 or 3, and $n2$ is 0 or 1, if either of $n1$ or $n2$ is 0, then both are 0; and $n3$ is 1 to 17 inclusive.

9. A plastic film according to claim 1 wherein said compound is

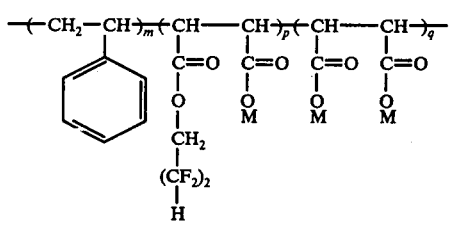

10. A plastic film according to claim 9 wherein M is sodium.

11. An undercoat-applied plastic film according to claim 1, wherein more than 10% of the total M's in said compound are cations selected from ammonium, sodium, potassium and lithium ions.

12. An undercoat-applied plastic film according to claim 1, wherein said compound has an average molecular weight of from 500 to 500,000.

13. An undercoat-applied plastic film according to claim 1, wherein the surface specific resistivity of the treated surface of the film is $10^7$ to $10^{12}$ $\Omega$cm at a temperature of 20° C. and a relative humidity of 50%.

14. An undercoat-applied plastic film according to claim 1 wherein said film substrate is subjected to a corona discharge treatment, an ultraviolet radiation treatment or a flame treatment before or after said solution or dispersion is applied to the substrate.

15. An undercoat-applied plastic film according to claim 1, wherein the solution or dispersion comprises water as the medium.

16. An undercoat-applied plastic film according to claim 1, wherein the solution or dispersion comprises, as the medium, water and an organic solvent miscible with water.

17. An undercoat-applied plastic film according to claim 1, wherein the solution or dispersion comprises an additive selected from film-hardening agents, matting agents, anti-blocking agents, surfactants, dyes and lubricants.

18. A method for undercoating a plastic film substrate according to claim 1 which comprises subjecting said film substrate to a corona discharge treatment, an ultraviolet radiation treatment or a flame treatment before or after said solution or dispersion is applied to the substrate.

* * * * *